Dec. 16, 1952     C. BRETSCHNEIDER     2,621,524
CLUTCH OPERATOR
Filed March 7, 1947
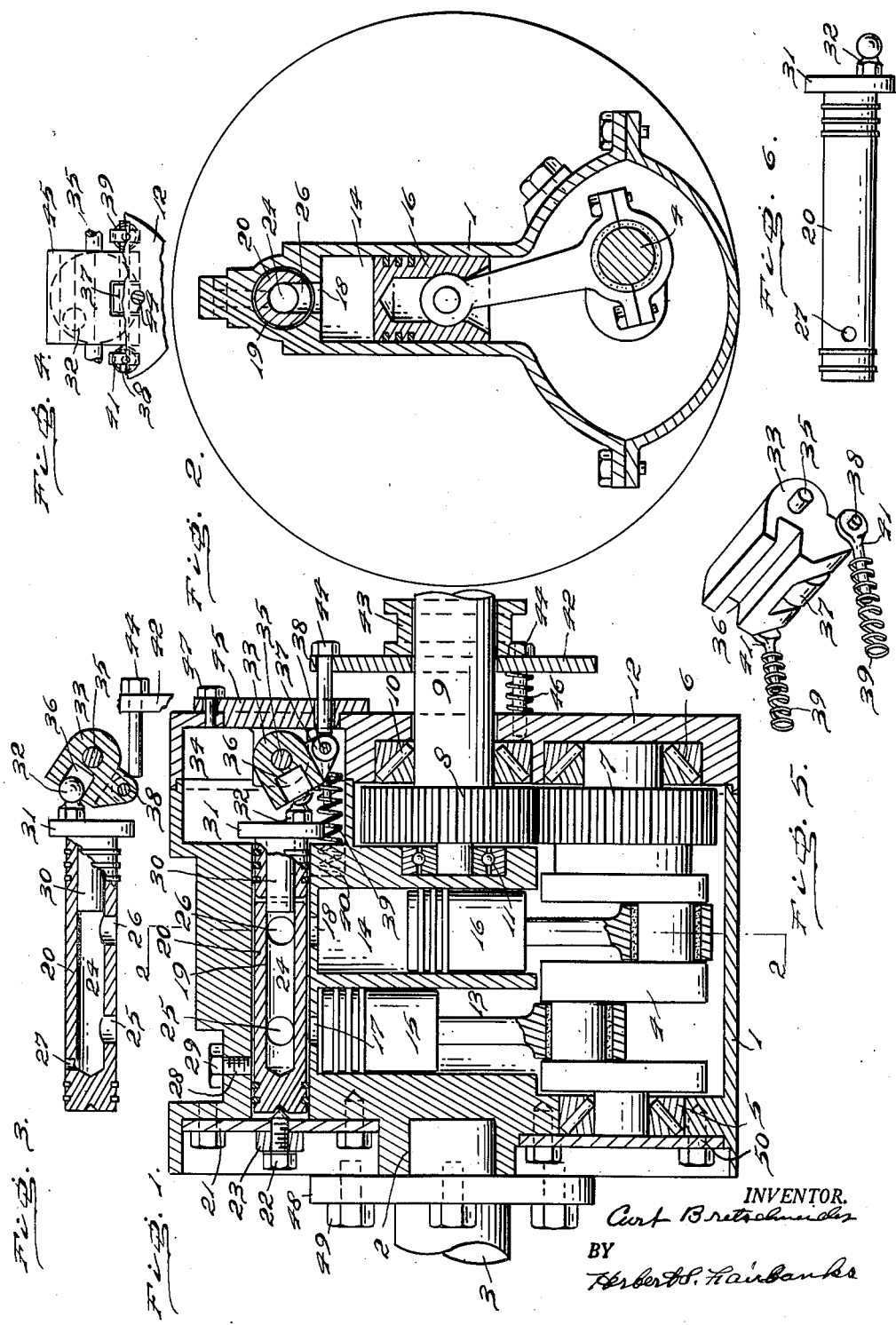
INVENTOR.
Curt Bretschneider
BY
Herbert P. Fairbanks
ATTORNEY.

Patented Dec. 16, 1952

2,621,524

UNITED STATES PATENT OFFICE 2,621,524

CLUTCH OPERATOR

Curt Bretschneider, Philadelphia, Pa.

Application March 7, 1947, Serial No. 733,010

1 Claim. (Cl. 74—104)

The object of this invention is to devise a novel clutch which will provide for varying speeds between zero and maximum speeds.

A further object of the invention is to devise a novel clutch having piston cylinders which are intercommunicating and such communication is manually controlled by a novel construction and arrangement of valve mechanism.

With the foregoing and other objects in view as will hereinafter clearly appear, my invention comprehends a novel construction and arrangement of a clutch.

It further comprehends a novel clutch having a housing adapted to be revolved by an engine shaft, having engine cylinders and pistons and having novel means for controlling the intercommunication between the cylinders.

For the purpose of illustrating the invention, I have shown in the accompanying drawings a preferred embodiment of it which will give in practice satisfactory and reliable results. It is, however, to be understood that the various instrumentalities of which the invention consists can be variously arranged and organized, and the invention is not limited to the exact arrangement and organization of these instrumentalities as herein set forth.

Figure 1 is an irregular sectional elevation of a clutch embodying my invention.

Figure 2 is a section on line 2—2 of Figure 1.

Figure 3 is a partial section of valve mechanism.

Figure 4 is an end view of Figure 3.

Figure 5 is a perspective view of a valve actuator.

Figure 6 is a side elevation of the valve.

Similar numerals of reference indicate corresponding parts.

Referring to the drawings:

The clutch has a housing 1, recessed at 2 to receive an engine shaft 3, fixed to the housing in any desired or conventional manner. A crank shaft 4 is journalled in roller bearings 5 and 6, carried by the housing. The crank shaft 4 has fixed to it a gear 7 which meshes with a gear 8 fixed on a driven shaft 9, which latter is journalled in a roller bearing 10 and a thrust bearing 11, carried by an end closure 12 secured to the housing 1 in any desired manner.

The housing 1 has piston chambers 13 and 14 in which pistons 15 and 16 are reciprocated by the crank shaft. The chamber 13 has a port 17 and the chamber 14 has a port 18, such ports opening into the ends of the piston chambers.

The housing 1 is apertured as at 19 to receive a rotatable valve 20. The aperture 19 is closed at one end by an end plate 21 which carries a threaded stud 22 which has a pointed end contacting the valve. The stud has a lock nut 23.

The valve 20 has an internal passage 24 communicating with ports 25 and 26 which can be brought into and out of register with the ports 17 and 18 in the housing. The valve 20 has a filling opening 27 to permit introduction of fluid through a filling opening 28 in the housing, said opening 28 being normally closed by a threaded plug 29. The passage 24 is closed at one end by a plug 30 having a flange 31 provided with an offset, ball shaped stud 32. This stud co-operates with an actuator 33 mounted in a chamber 34 in the housing 1 and the end member 12. The actuator 33 has a shaft 35 mounted in the chamber 34 and provided with a slot 36 opening through one side and adapted to receive the stud 32. The actuator is recessed to receive a roller 37 on a rod 38 fixed to the actuator. The actuator is tensioned by springs 39, the inner ends of which are seated in recesses 40 in the housing 1.

In order to permit the proper movement of the outer ends of the springs rods 41 have eyes loosely mounted on the rod 38 and the rods 41 extend into the springs 39.

A clutch plate 42 is loosely mounted on the shaft 9 and has a clutch collar 43 to receive the conventional clutch pins of a clutch lever. The clutch plate has fixed to it pins 44, one of which is guided in a cover plate 45 and bears against the roller 37 of the valve actuator 33. Springs 46 are interposed between the end member 12 and the clutch plate 42. The valve actuator 33 has its shaft 35 journalled in the cover plate 45. The cover plate 45 is fixed to the end member 12 by fastening devices 47.

As illustrated the driving shaft 3 has a flange 48 secured to the housing by bolts 49.

The end plate 21 provides access to the valve, and a similar plate 50 provides access to the roller bearing 5.

The operation will now be apparent to those skilled in this art and is as follows:

The clutch can operate under air, vacuum or any suitable fluid. If oil is to be used it may be introduced through filling openings 28 and 27.

When the valve is in its closed position as seen in Figure 1, the pistons are locked in position and do not move, so that the driven shaft 9 revolves at the same speed as the driving or engine shaft 3.

When the clutch plate 42 is moved into an inward position, a pin 44 rocks the valve actuator 33 to bring ports 25 and 26 into a position to communicate with ports 17 and 18 of the piston chambers 13 and 14. This permits a predetermined amount of fluid to pass from one piston chamber to another piston chamber and the reciprocation of the pistons. The driven shaft 9 will now have the desired speed relationship with the driving shaft 3.

When the ports are fully opened, the fluid can freely pass from one piston chamber to the other and the shaft 9 will stop.

It will thus be clear that depending upon the amount of opening of the ports of the valve any desired speed between engine speed and zero can be obtained.

The housing acts as a fly wheel, and the usual starting gear can be fixed to the housing.

Having thus described my invention, what I claim as new and desire to secure by Letters Patent is:

An actuator for a valve rotatably mounted having an offset stud, comprising an elongated member having a slot extending longitudinally through it and opening through its periphery, a rotatably mounted shaft fixed to said member, a shaft extending offcenter through said member, springs acting against said shaft to move said member in one direction, a roller on said offcenter shaft, and a pin contacting said roller to move the member in the opposite direction.

CURT BRETSCHNEIDER.

REFERENCES CITED

The following references are of record in the file of this patent:

UNITED STATES PATENTS

| Number | Name | Date |
|---|---|---|
| 45,639 | Rollins | Dec. 27, 1864 |
| 912,487 | Ramsey | Feb. 16, 1909 |
| 955,390 | Denegre | Apr. 19, 1910 |
| 1,217,700 | Brown et al. | Feb. 27, 1917 |
| 1,243,611 | Kemper | Oct. 16, 1917 |
| 1,343,944 | Tomoda | June 22, 1920 |
| 1,637,968 | Simpson | Aug. 2, 1927 |
| 1,907,673 | Rockwell | May 9, 1933 |
| 2,176,083 | Leake | Oct. 17, 1939 |

FOREIGN PATENTS

| Number | Country | Date |
|---|---|---|
| 365,227 | France | Sept. 5, 1906 |
| 932 | Australia | Mar. 2, 1926 |
| 363,489 | Great Britain | Dec. 24, 1931 |
| 747,218 | France | June 13, 1933 |